(12) United States Patent
Mizoguchi (10) Patent No.: US 6,968,144 B2
(45) Date of Patent: Nov. 22, 2005

(54) PHOTOCONDUCTOR DRUM AND DRIVE SHAFT GEAR PORTIONS OF AN IMAGE FORMING APPARATUS

(75) Inventor: Yoshihiro Mizoguchi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/618,004

(22) Filed: Jul. 11, 2003

(65) Prior Publication Data

US 2004/0151518 A1    Aug. 5, 2004

(30) Foreign Application Priority Data

Jul. 12, 2002    (JP) .......................... P. 2002-203812
Jun. 25, 2003    (JP) .......................... P. 2003-180834

(51) Int. Cl.$^7$ ........................................... G03G 15/00
(52) U.S. Cl. ...................................................... 399/167
(58) Field of Search ........................ 399/111, 116, 117, 399/159, 167

(56) References Cited

U.S. PATENT DOCUMENTS

| 3,249,377 | A |   | 5/1966 | Weasler |
| 4,993,992 | A | * | 2/1991 | Kriegel .......................... 464/137 |
| 6,193,629 | B1 | * | 2/2001 | Tenzor et al. ................ 477/124 |
| 6,285,847 | B1 |   | 9/2001 | Tanizaki et al. |
| 6,671,475 | B2 | * | 12/2003 | Katada et al. .............. 399/111 |
| 2002/0085858 | A1 |   | 7/2002 | Yamaguchi et al. |

FOREIGN PATENT DOCUMENTS

| GB | 2 141 520 A | 12/1984 |
| JP | 2000-352898 | 12/2000 |

OTHER PUBLICATIONS

Patent Abstracts of Japan, Tajima Kazuhiko, "Image Forming Device", Publication No.: 2000352898, Publication Date: Dec. 19, 2000, 1 page.

* cited by examiner

Primary Examiner—Sandra L. Brase
(74) Attorney, Agent, or Firm—Pearne & Gordon LLP (57) ABSTRACT

An image forming apparatus includes a photoconductor drum in which a first gear portion is formed on the axis of rotation and on which an electrostatic latent image corresponding to a toner image is formed by a rotation in a circumferential direction; a developing roller which is set correspondingly to the photoconductor drum, and makes visible the electrostatic latent image formed on the photoconductor drum thereby to form a toner image; and a photoconductor drive shaft having a second gear portion engaging with the first gear portion and formed on an axis of rotation, which gears with the photoconductor drum on the same axis and rotation-drives this photoconductor drum. Further, in at least either of the first gear portion and the second gear portion, an axial length of a part of gear teeth constituting the gear portion is different from axial lengths of other teeth.

8 Claims, 6 Drawing Sheets

PHOTOCONDUCTOR DRUM AND DRIVE SHAFT GEAR PORTIONS OF AN IMAGE FORMING APPARATUS

BACKGROUND OF THE INVENTION

The present invention relates to an image forming apparatus.

Conventionally, in an image forming apparatus adopting an electrophotographic form, a photoconductor that is an image bearing member is charged by a charger, the charged photoconductor is irradiated with light according to image data to form a latent image thereon, this latent image is developed by a developing device, and the developed toner image is transferred onto a recording medium, whereby an image is formed.

On the other hand, with colorization of image, a tandem type color image forming apparatus is also proposed, in which plural image forming units executing such each image forming process are provided, toner images of cyan, magenta, yellow, and preferably black are formed on the respective photoconductors, and these toner images are multi layer transferred onto an endless intermediate transfer member in a transfer position of each photoconductor, whereby a full color image is formed.

Since such the tandem type color image forming apparatus has an image forming section for each color, it is advantageous for speed-up.

A conventional tandem type color image forming apparatus will be described below.

Figure 7:
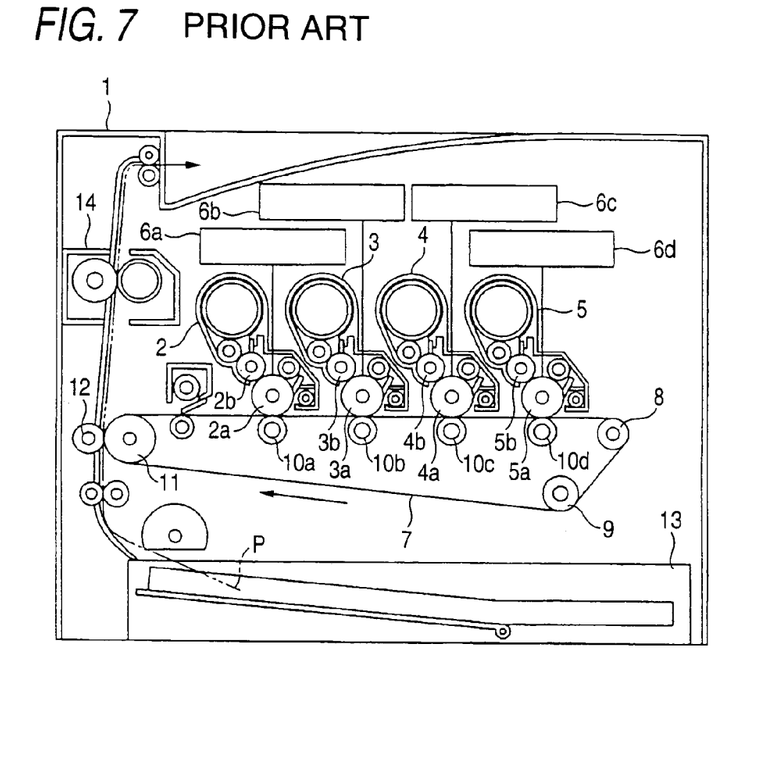
FIG. 7 is a schematic diagram showing the constitution of a conventional color image forming apparatus.
Figure 8:
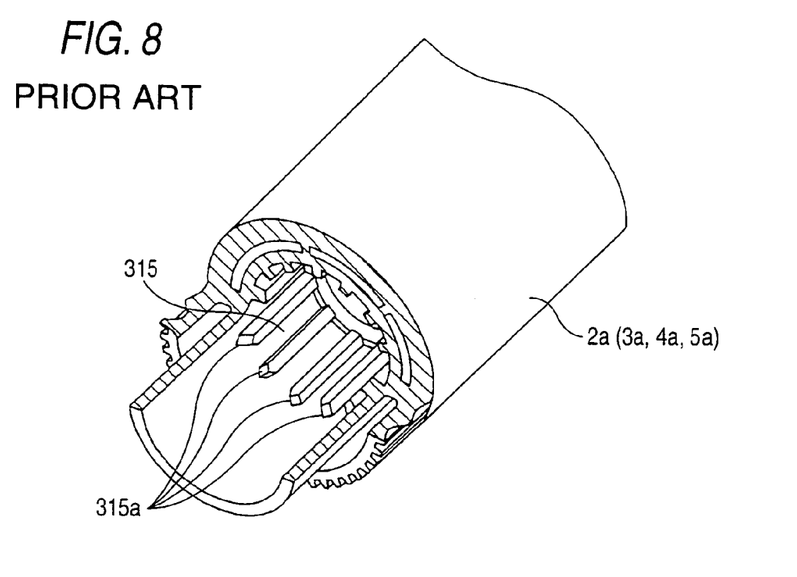
FIG. 8 is a partial perspective view in which a gear portion used in the photoconductor drum of the conventional color image forming apparatus is partially broken.

FIG. 7 is a schematic view showing the constitution of the conventional color image forming apparatus. FIG. 8 is a perspective view in which a first gear portion 315 used in a photoconductor drum of the conventional color image forming apparatus is partially broken.

In FIG. 7, in a body 1 of the color image forming apparatus, image forming units 2, 3, 4 and 5 for forming respectively toner images of each color of yellow (Y), magenta (M), cyan (C), and black (K) are arranged, and exposing devices 6a, 6b, 6c, and 6d respectively corresponding to these image forming units 2 to 5 are provided. The image forming units 2 to 5 include photoconductor drums (photoconductors) 2a, 3a, 4a, and 5a on peripheral surfaces of which electrostatic latent images are formed by irradiation of laser beams from the exposing devices 6a to 6d; and developing rollers 2b, 3b, 4b, and 5b (developing units) which attach toner supplied from toner tanks onto the photoconductor drums 2a to 5a to make the electrostatic latent images visible as toner images.

On the lower sides of the image forming units 2 to 5, an endless intermediate transfer belt (intermediate transfer member) 7 on which a color toner image is formed by multi layer transferring the toner images of the respective colors made visible on the photoconductor drums 2a, 3a, 4a, and 5a is arranged so that it can run in the direction of an arrow. The intermediate transfer belt 7 includes a drive roller 8, a tension roller 9, four first bias transfer rollers 10a, 10b, 10c and 10d, and a driven roller 11 in its loop.

At the lower portion of the apparatus, a paper supply cassette 13 storing paper (recording medium) P therein is provided. The paper P is fed out from the paper supply cassette 13 to a paper transport path one by one by a supply roller.

On the paper transport path, a second bias transfer roller 12 which comes into contact with the peripheral surface of the intermediate transfer belt 7 by the predetermined amount in the position of the driven roller 11 thereby to transfer the color image on the intermediate transfer belt 7 onto the paper P, and a fixing device 14 which fixes the color image transferred onto the paper P onto the paper P are arranged.

In the thus structured image forming apparatus, onto the surface of the intermediate transfer belt 7, the toner images of yellow, magenta, cyan and black adhere from the photoconductor drums 2a to 5a in the image forming units 2 to 5 and the color image is formed. This toner color image is transferred onto the paper P taken out of the sheet supply cassette 13 by the nip power between the driven roller 11 and the second bias transfer roller 12. Then, the paper P is supplied to the fixing device 14, the toner image is fixed thereon, and thereafter the paper P is exhausted.

Here, as shown in FIG. 8, at the inner surrounding of one end of each of the photoconductor drums 2a to 5a, a first gear portion 315 having plural teeth 315a extending axially is formed on the axis of rotation. Further, at the outer surrounding of the photoconductor drive shaft, a second gear portion engaging with this first gear portion 315 is formed on the axis of rotation. By the first gear portion 315 and the second gear portion, each photoconductor drum 2a to 5a and each photoconductor drive shaft gear with each other on the same axis, so that each photoconductor drum 2a to 5a is rotation-driven by each photoconductor drive shaft. Such the rotation-drive and gear constitution have been disclosed in, for example, US Pub. No. 2002/0085858A1, U.S. Pat. No. 6,285,847 B1, and JP-A-2000-352898.

However, when each image forming unit 2 to 5 is attached to the image forming apparatus body, in case that the first gear portion 315 on the photoconductor drum 2a to 5a side and the second gear portion on the photoconductor drive shaft side are in the same phase, the leading ends of their teeth come into contact with each other, so that the photoconductor drive shaft is not inserted into the photoconductor drum 2a to 5a.

SUMMARY OF THE INVENTION

Therefore, an object of the invention is to provide an image forming apparatus which can smoothly perform gear coupling between a photoconductor and a photoconductor drive shaft driving this photoconductor.

In order to solve this problem, an image forming apparatus of the invention includes: a photoconductor in which a first gear portion is formed on the axis of rotation and on which an electrostatic latent image corresponding to a toner image is formed by a rotation in a circumferential direction; a developing unit which is set correspondingly to the photoconductor, and makes visible the electrostatic latent image formed on the photoconductor thereby to form a toner image; and a photoconductor drive shaft having a second gear portion engaging with the first gear portion and formed on an axis of rotation, which gears with the photoconductor on the same axis and rotation-drives this photoconductor, in that at least either of the first gear portion and the second gear portion, an axial length of a part of teeth constituting the gear portion is different from axial lengths of other teeth.

According to the invention, in case that the first gear portion on the photoconductor side and the second gear portion on the photoconductor drive shaft side are in the same phase, only the leading end of the tooth that is longer than the other teeth comes into contact with the leading end of the tooth of the gear portion on the other side. Therefore, the first gear portion and the second gear portion are not in the phase readily between the partial teeth coming into contact with each, so that gear coupling between the photoconductor and the photoconductor drive shaft driving this conductor can be smoothly performed.

According to the first aspect of the invention, an image forming apparatus includes a photoconductor in which a first gear portion is formed on the axis of rotation and on which an electrostatic latent image corresponding to a toner image is formed by a rotation in a circumferential direction; a developing unit which is set correspondingly to the photoconductor, and makes visible the electrostatic latent image formed on the photoconductor thereby to form a toner image; and a photoconductor drive shaft having a second gear portion engaging with the first gear portion and formed on an axis of rotation, which gears with the photoconductor on the same axis and rotation-drives this photoconductor. Further, in at least either of the first gear portion and the second gear portion, an axial length of a part of teeth constituting the gear portion is different from axial lengths of other teeth.

In case that the first gear portion and the second gear portion are in the same phase, only the leading end of the tooth that is longer than other teeth comes into contact with the leading end of the tooth of the gear portion on the other side. Therefore, the first gear portion and the second gear portion are not in the phase readily between the partial teeth coming into contact with each, so that gear coupling between the photoconductor and the photoconductor drive shaft driving this conductor can be smoothly performed.

BRIEF DESCRIPTION OF THE PREFERRED EMBODIMENTS

DETAILED DESCRIPTION OF THE PREFERRED EMBODIMENTS

One embodiment of the invention will be described below with reference to FIGS. 1 to 4. In these figures, like members are given like reference characters, and the overlapping description is omitted.

Figure 1:
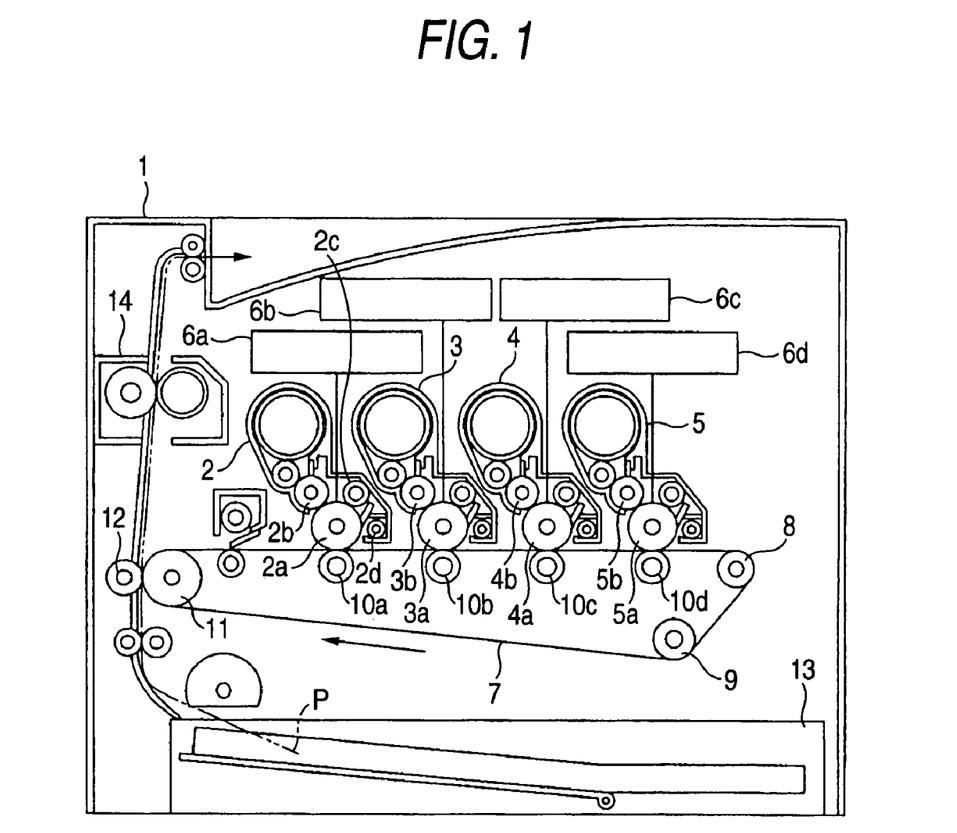
FIG. 1 is a schematic diagram showing the constitution of a color image forming apparatus in one embodiment of the invention.

In FIG. 1, in a body 1 of a color image forming apparatus, image forming units 2, 3, 4 and 5 for forming respectively toner images of each color of yellow (Y), magenta (M), cyan (C), and black (K) are detachably arranged in order, and exposing devices 6a, 6b, 6c, and 6d corresponding to these respective image forming units 2 to 5 are provided.

Figure 4:
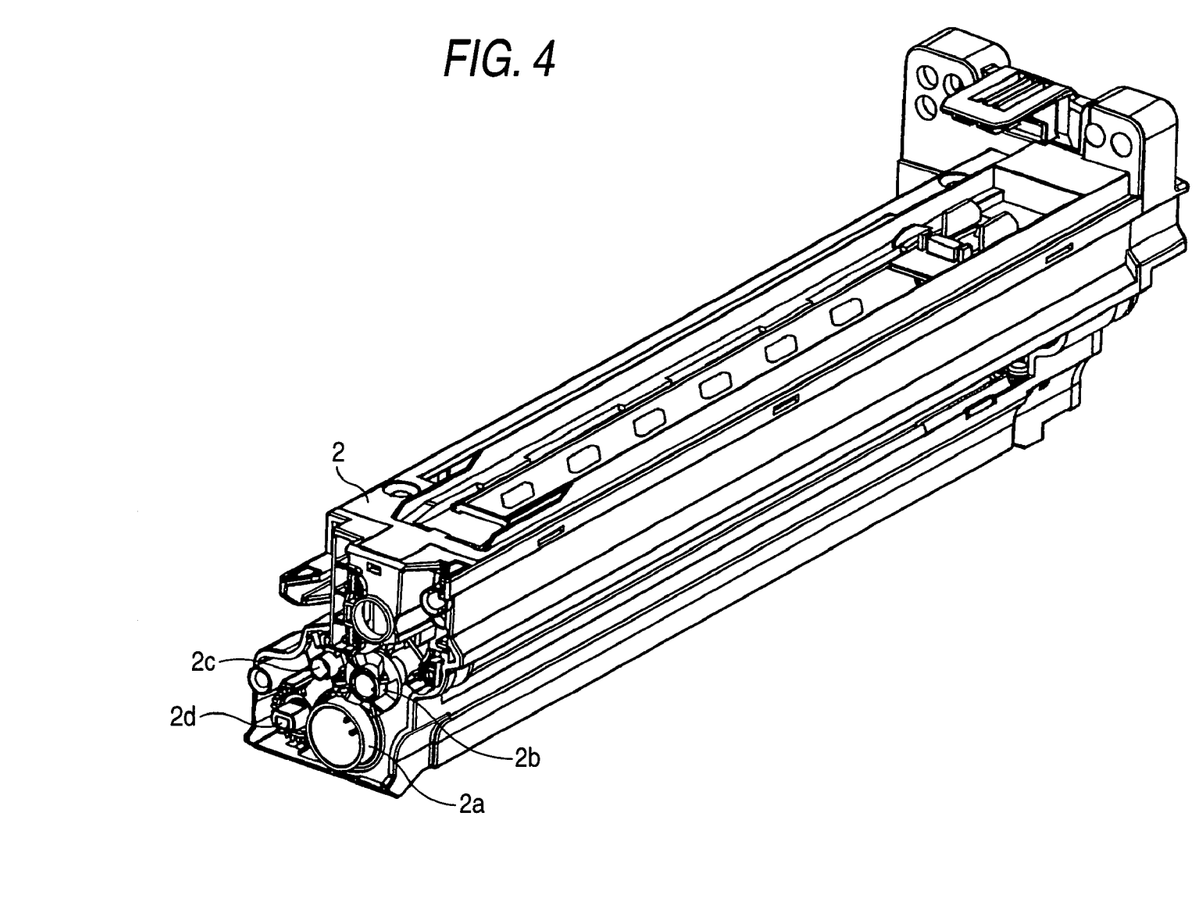
FIG. 4 is a perspective view showing an image forming unit.

The image forming units 2 to 5 include photoconductor drums (photoconductors) 2a, 3a, 4a, and 5a which are image bearing members rotatably provided; developing rollers 2b, 3b, 4b, and 5b which attach toner supplied from toner tanks onto the photoconductor drums 2a to 5a on the peripheral surfaces of which electrostatic latent images are formed by irradiation of laser beams from exposing devices 6a to 6d thereby to make the electrostatic latent images visible as toner images; charge rollers 2c, 3c, 4c, and 5c; and toner discharging screws 2d, 3d, 4d, and 5d. The photoconductor drums 2a, 3a, 4a, and 5a rotating in the circumferential direction are arranged in a line so that their rotary center axes become parallel with one another. FIG. 4 is a perspective view of the image-forming unit 2, and the other image forming units 3, 4, and 5 have the similar structure.

Figure 2:
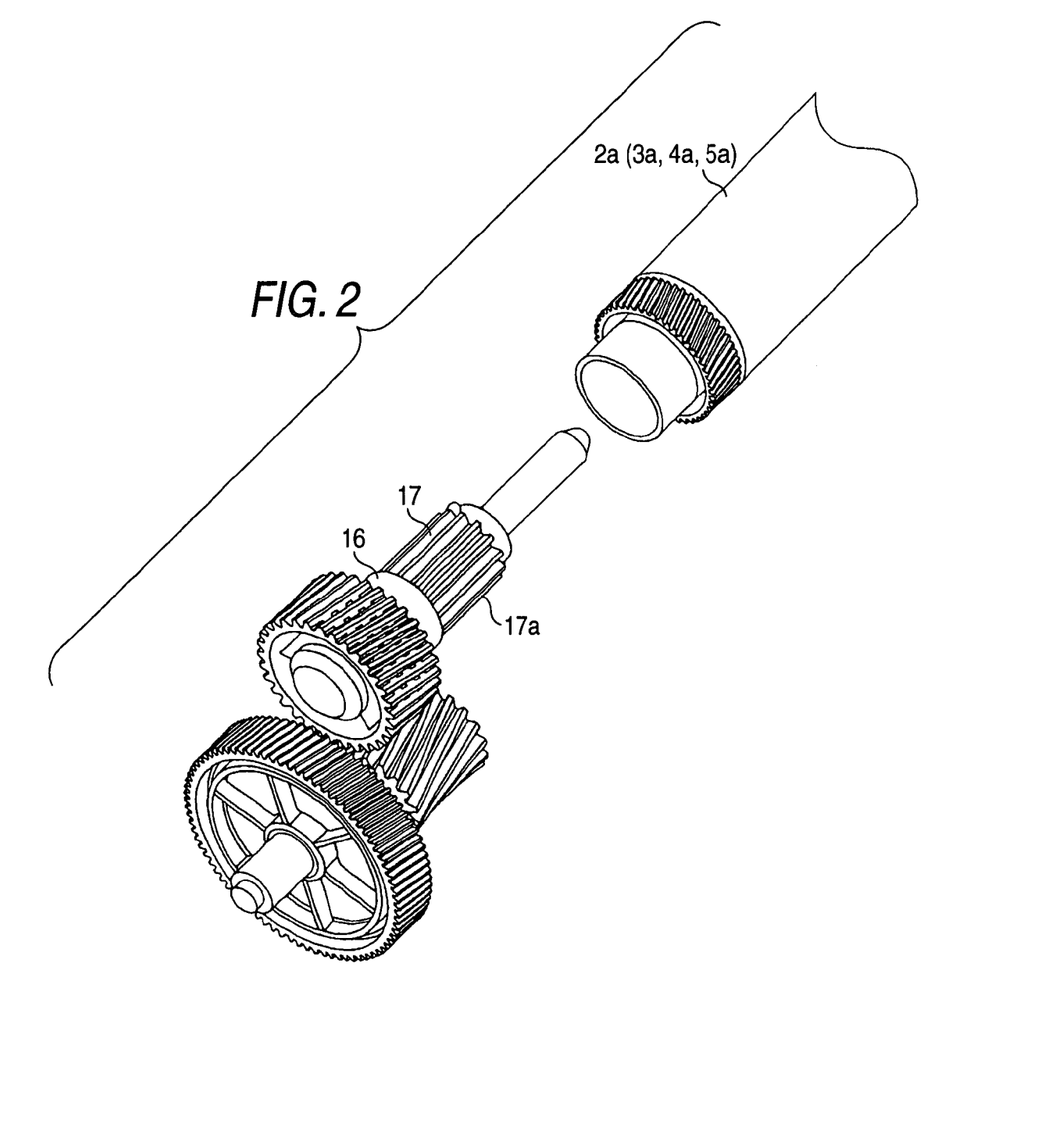
FIG. 2 is a partial perspective view of a portion showing a photoconductor drum and a photoconductor drive shaft in the color image forming apparatus of FIG. 1.
Figure 3:
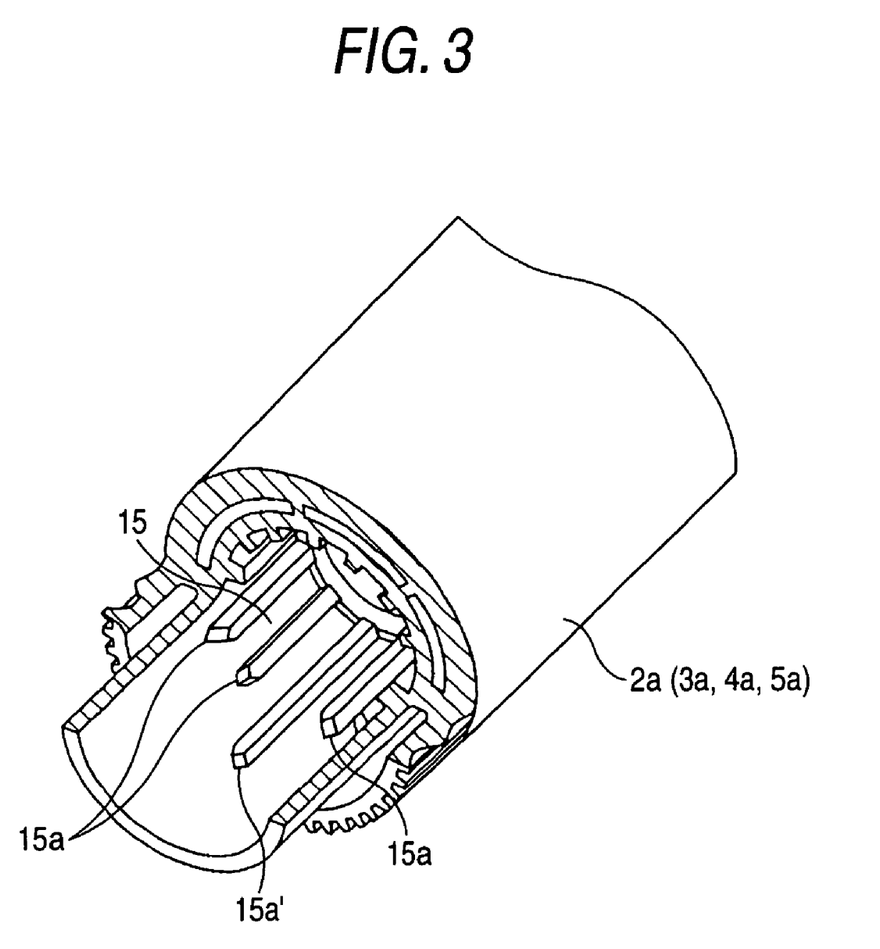
FIG. 3 is a partial perspective view in which a gear portion formed in the photoconductor drum of FIG. 2 is partially broken.

Here, as shown in FIGS. 2 and 3, on the inner surrounding of each photoconductor drum 2a to 5a, a first gear portion 15 having plural teeth 15a extending axially is formed on an axis of rotation. Further, on the outer surrounding of each photoconductor drive shaft 16, a second gear portion 17 having plural teeth 17a extending axially and engaging with the first gear portion 15 is formed on an axis of rotation.

Each photoconductor drum 2a to 5a and each photoconductor drive shaft 16 are geared to each other by the first gear portion 15 and the second gear portion 17 on the same axis, where by rotation drive power is transmitted from each photoconductor drive shaft 16 to each photoconductor drum 2a to 5a, and each photoconductor drum 2a to 5a rotates. On drive of each photoconductor drive shaft 16, the constitution disclosed in JP-A-2002-352898 may be adopted, or the constitution in which drive power of a drive source such as a motor is transmitted by plural gears may be adopted.

As shown in FIG. 3, of plural teeth 15a in the first gear portion 15 formed in each photoconductor drum 2a to 5a, its partial tooth 15a' (one tooth in this embodiment) is longer in axial length than other teeth 15a.

In the embodiment, only one tooth 15a' of the first gear portion 15 is longer than other teeth 15a. However, two or more teeth may be longer. Namely, plural teeth 15a' may be different in axial length from other teeth 15a.

Further, the partial tooth 15a' of the first gear portion 15 is not made longer than other teeth 15a but a part of teeth 17a of the second gear portion 17 maybe made longer substitutingly, or partial teeth 15a and 17a in both first gear portion 15 and second gear portion 17 may be different in axial length from other teeth 15a and 17a.

In FIG. 1, on the lower sides of the arranged image forming units 2 to 5, an endless intermediate transfer belt (intermediate transfer member) 7 on which a color toner image is to be formed by multi layer transferring the toner images of the respective colors made visible on the photoconductor drums 2a, 3a, 4a, and 5a is arranged so that it can run in the direction of an arrow. The intermediate transfer belt 7 includes in its loop a drive roller 8 which runs this intermediate transfer belt 7; a tension roller 9 which applies the predetermined tension to the intermediate transfer belt 7; four first bias transfer rollers 10a, 10b, 10c and 10d which are arranged correspondingly to each of the photoconductor drums 2a to 5a, and bring the intermediate transfer belt 7 into pressure contact with the respective photoconductor drums 2a to 5a thereby to transfer the toner images of the respective colors on the photoconductor drums 2a to 5a onto the intermediate transfer belt 7; and a driven roller 11 which rotates by rotation of the intermediate transfer belt 7 produced by the drive roller 8. The intermediate transfer belt 7 is driven in the direction of an arrow so as to move around these parts.

The tension roller 9, during printing, is energized by a spring (not shown) in the figure, and moves to the lower right thereby to apply tension to the intermediate transfer belt 7. Further, during no-printing, the tension roller 9 releases the application of the tension to the intermediate transfer belt 7 so that rolling traces caused by rolling of the intermediate transfer belt 7 around each roller in the same position for a long time do not leave.

At the lower portion of the apparatus, a paper supply cassette 13 storing paper (recording medium) P therein is provided. The paper P is fed out from the paper supply cassette 13 to a paper transport path one by one by a supply roller.

On the paper transport path, a second bias transfer 12 which comes into contact with the peripheral surface of the intermediate transfer belt 7 by the predetermined amount in the position of the driven roller 11 to transfer the color image formed on this intermediate transfer belt 7 onto the paper P, and a fixing device 14 which fixes the color image transferred onto the paper P onto the paper P by pressure and heat produced by nip rotation of the rollers are arranged.

In the thus structured image forming apparatus, firstly on the photoconductor drum 2a of the image-forming unit 2, a latent image of yellow component color in image data is formed. This latent image is made visible as a yellow toner image by the developing device 2b having yellow toner, and transferred as the yellow toner image on the intermediate transfer belt 7 by the first bias transfer roller 10a.

On the other hand, while the yellow toner image is being transferred onto the intermediate transferbelt 7, a latent image of magenta component color is formed in the image forming unit 3, and successively it is made visible as a magenta toner image by the developing unit 3b having magenta toner. Next, on the intermediate transfer belt 7 in which transfer of the yellow toner image in the image forming unit 2 has been already completed, the magent a toner image is transferred by the first bias transfer roller 10b in the image forming unit 3, so that the yellow toner image and the magenta toner image are multilayered.

Also regarding a cyan toner image and a black toner image, image formation is similarly performed, and multilayer transfer of toner images of four colors on the intermediate transfer belt 7 is completed.

The color image formed on the intermediate transfer belt 7 is transferred in the lump onto paper P supplied from the sheet supply cassette 13 by the nip power between the driven roller 11 and the second bias transfer roller 12. Then, the transferred toner images are heat-fixed on the paper P by the fixing device 14, and a full color image is formed on this paper P. Thereafter, the paper P is exhausted.

In such the color image forming apparatus, as described before, of plural teeth 15a in the first gear portion 15 formed in each photoconductor drum 2a to 5a, its partial tooth 15a' is longer in axial length than other teeth 15a.

Therefore, when the image forming unit 2 to 5 are attached to the image forming apparatus body, in case that the first gear portion 15 on the photoconductor drum 2a to 5a side and the second gear portion 17 on the photoconductor drive shaft side 16 are in the same phase, only the leading end of the tooth 15a' (one tooth in this embodiment) that is longer than the other teeth 15a comes into contact with the leading end of the tooth 17a of the second gear portion 17, but all the teeth 15a and all the teeth 17a do not come into contact with each other. Therefore, the first gear portion 15 and the second gear portion 17 are not in the phase readily between the long tooth 15a' and the tooth 17a which firstly come into contact with each other when the image forming unit 2 to 5 is attached, so that gear coupling between the photoconductor drum 2a to 5a and the photoconductor drive shaft 16 driving this conductor drum can be smoothly performed.

Second Embodiment

A second embodiment of the invention will be described with reference to FIGS. 5 and 6. This second embodiment is different from the first embodiment in only the constitutions of a first gear portion 15 and a second gear portion 17 on a photoconductor drive shaft 16 side. Since other constitutions are practically the same, their description is omitted.

Figures 5, 6:
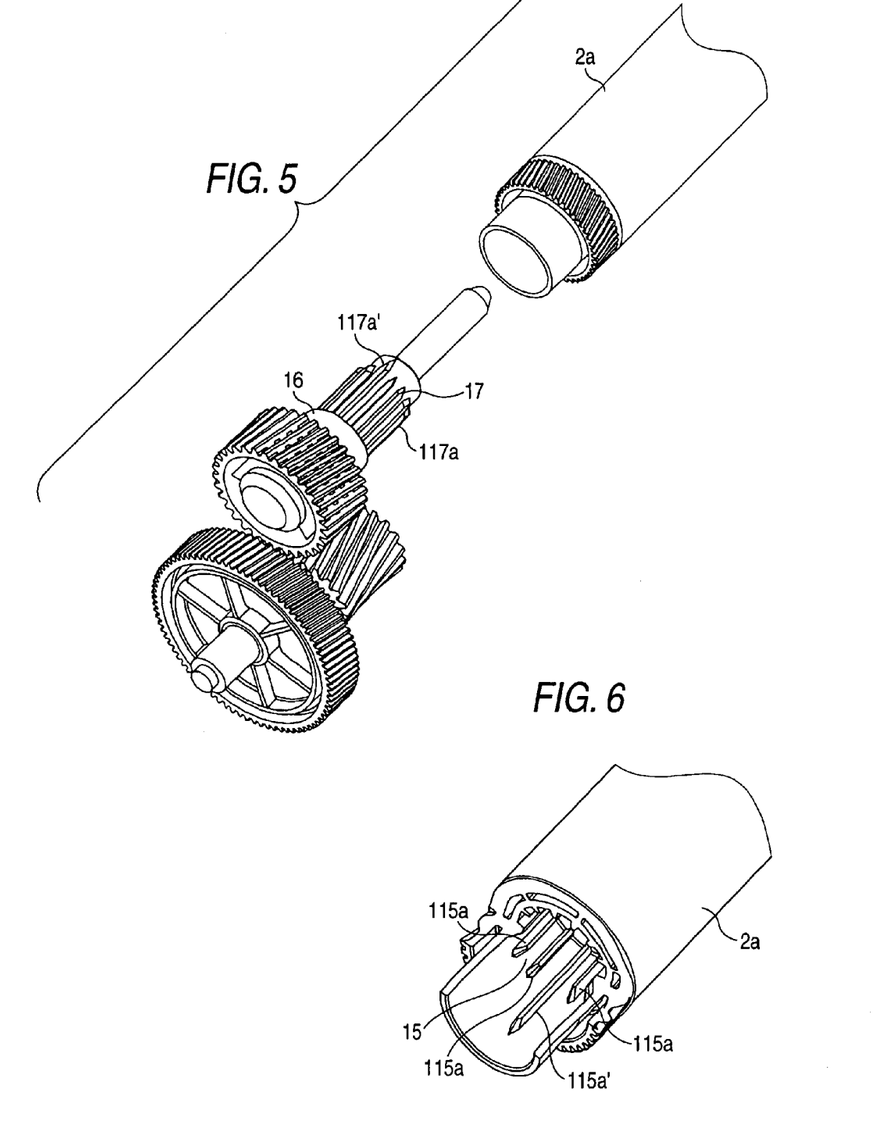
FIG. 5 is a partial perspective view of a portion showing a photoconductor drum and a photoconductor drive shaft in a second embodiment of the invention.
FIG. 6 is a partial perspective view in which a gear portion formed in the photoconductor drum of FIG. 5 is partially broken.

As shown in FIG. 5, of plural teeth 117a provided for the second gear portion 17, only one tooth 117a' is longer in axial length than other teeth 117a.

Further, as shown in FIG. 6, of plural teeth 115a provided for the first gear portion 15, only one tooth 115a' is longer in axial length than other teeth 115a.

Further, tapers are provided for leading end portions of each gears 117a, 117a', 115a and 115a' in the axial direction and in the rotational direction in order to smooth fitting between a photoconductor drum and a photoconductor drive shaft even if the respective gears come into contact with each other when an image forming unit 2 to 5 is attached to an image forming apparatus body 1.

Although the gears and teeth are explained in the above description, the present invention may be adapted for spline coupling. Namely, shafts with longitudinal gearlike ridges (called "splines") along their interior or exterior surfaces are mated. In this case, one of ridges is made longer than the others.

Though an example in which the invention is applied to an image forming apparatus which forms a color image has been described above, the invention can be also applied to an image forming apparatus which forms a monochrome image.

As described above, according to the invention, when the image forming units 2 to 5 are attached to the image forming apparatus body 1, in case that the first gear portion on the photoconductor side and the second gear portion on the photoconductor drive shaft side are in the same phase, only the leading end of the tooth that is longer than the other teeth comes into contact with the leading end of the tooth of the gear portion on the other side. Therefore, the first gear portion and the second gear portion are not in the phase readily between the partial teeth coming into contact with each, so that such the effective advantage can be obtained that gear coupling between the photoconductor and the photoconductor drive shaft driving this conductor can be smoothly performed, and the image forming units 2 to 5 can be readily attached to the image forming apparatus 1.

What is claimed is:

1. An image forming apparatus comprising:
    a body of the image forming apparatus;
    an image forming unit which includes a photoconductor drum, and a developing roller that makes an electrostatic latent image formed on said photoconductor drum visible by toner, and which is attached to the body; and
    a photoconductor drive shaft which is provided for the body, and transmits drive power to said photoconductor drum via splines,
    wherein at least one spline of first splines formed axially on said photoconductor drum and second splines formed axially on said photoconductor drive shaft is longer axially than the other splines formed on the same axis wherein at least one of said first splines is longer than other first splines, and at least one of said second splines is longer than other second splines.

2. The image forming apparatus according to claim 1, wherein tapers are provided for a leading end portion of said first spline and a leading end portion of said second spline in order to smooth fitting between said photoconductor drum and said photoconductor drive shaft when said image forming unit is attached to said image forming apparatus body.

3. The image forming apparatus according to claim 2, wherein said tapers are formed in the axial directions and in the rotational directions of said photoconductor drum and said photoconductor drive shaft.

4. The image forming apparatus according to claim 1, wherein said spline coupling is provided at an end portion of said photoconductor drum.

5. The image forming apparatus comprising:
a body of the image forming apparatus;
an image forming unit which includes a photoconductor drum, a charge roller that charges said photoconductor drum, and a developing roller that makes an electrostatic latent image formed on said photoconductor drum visible by toner, and which is attached to the body; and
a photoconductor drive shaft which is provided for the body, and transmits drive power to said photoconductor drum via spline means for transmitting a driving force,
wherein said spline means includes facilitating means for facilitating a connection between said photoconductor drive shaft and said photoconductor drum,
wherein said facilitating means further includes a spline on said photoconductor drum axially longer than other splines and a spline on said photoconductor drive shaft axially longer than other splines.

6. The image forming apparatus according to claim 5, wherein a taper is formed on an end of said facilitating means for smoothening said connection between said photoconductor drive shaft and said photoconductor drum.

7. The image forming apparatus according to claim 6, wherein said taper is formed in the axial directions and in the rotational directions of said photoconductor drum and said photoconductor drive shaft.

8. The image forming apparatus according to claim 5, wherein said spline means is provided at an end portion of said photoconductor drum.

* * * * *